UNITED STATES PATENT OFFICE.

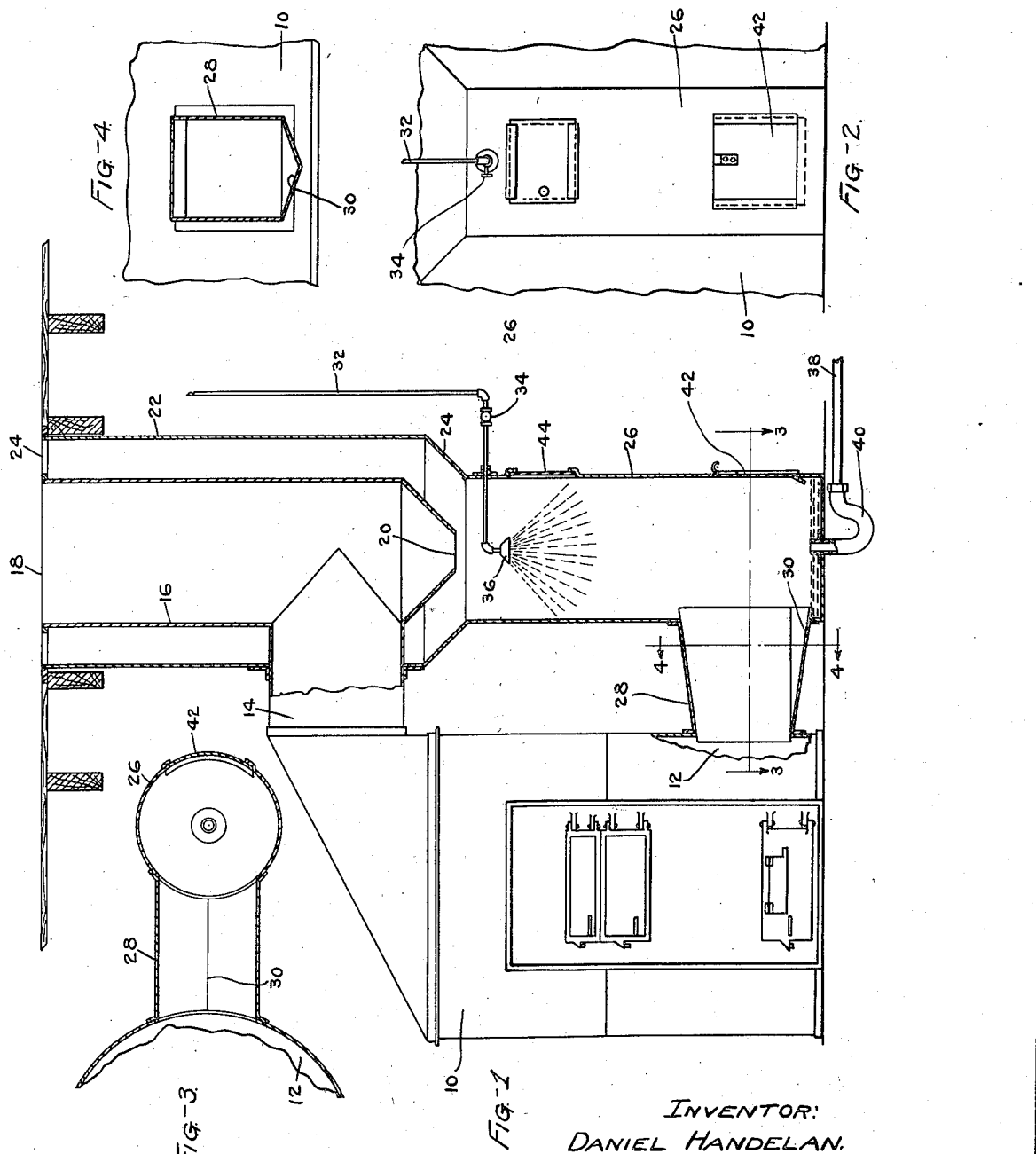

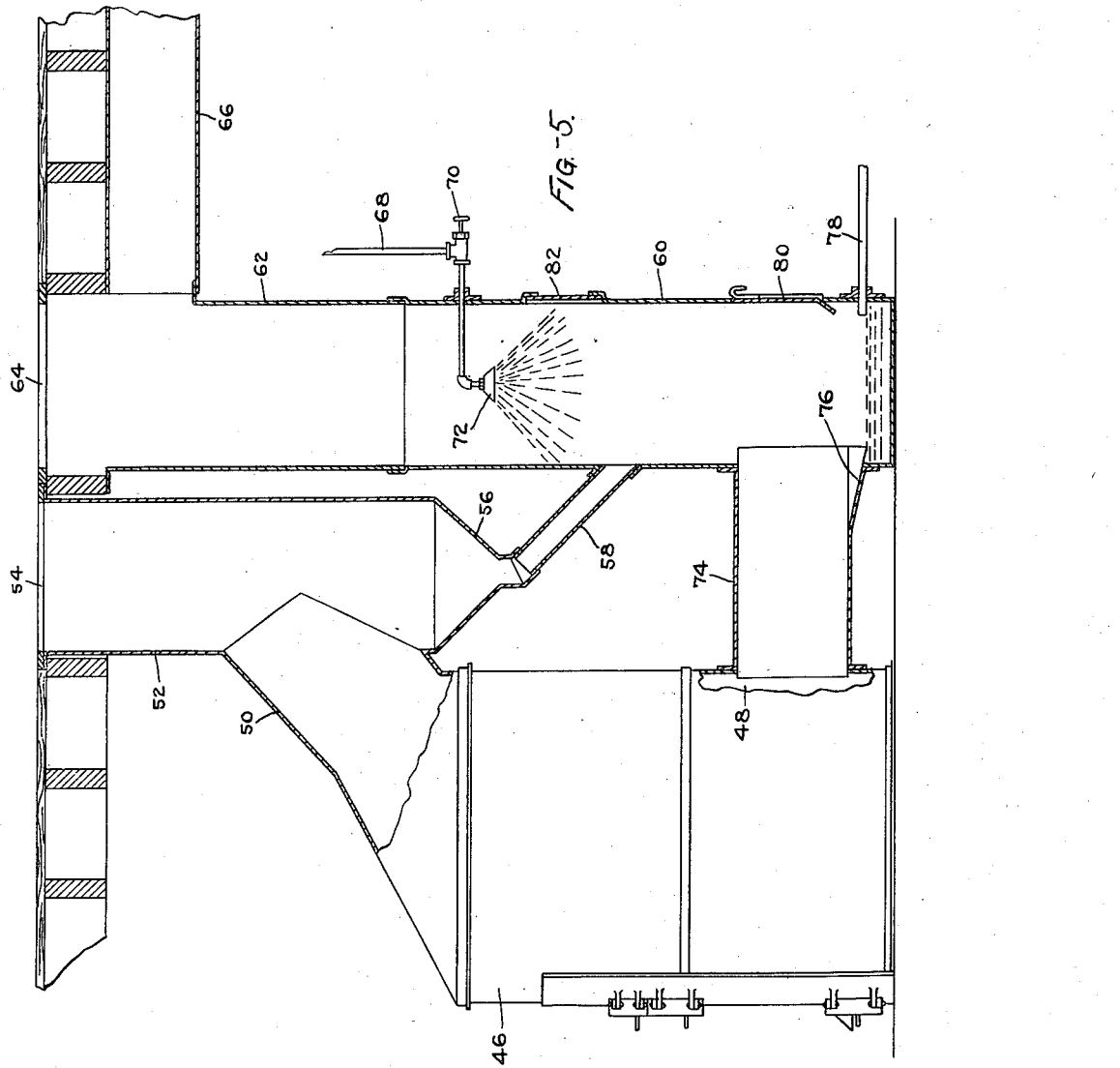

DANIEL HANDELAN, OF ABERDEEN, SOUTH DAKOTA.

AIR FILTER FOR HOT-AIR FURNACES.

1,402,601.  Specification of Letters Patent.  Patented Jan. 3, 1922.

Application filed June 27, 1921. Serial No. 480,743.

*To all whom it may concern:*

Be it known that I, DANIEL HANDELAN, a citizen of the United States, residing at Aberdeen, in the county of Brown and State of South Dakota, have invented certain new and useful Improvements in Air Filters for Hot-Air Furnaces, of which the following is a specification.

My invention relates to air filters for hot air furnaces and has for an object the provision of a device which will effectively remove dust and impurities from the cold air which is supplied to the hot air chamber of a furnace to be heated and distributed to the rooms of the building containing the furnace. Another object is the provision of an air filter for this purpose in which the air which is to be filtered or cleaned will be subjected to the action of water in such manner that the dust and other impurities will be retained or washed away, the air also being moistened during this operation. An object in particular is to provide a construction which will prevent the dirt and mud which falls through the hot air register from getting into the hot air chamber, especially in connection with so-called pipeless hot air furnaces.

The full objects and advantages of my invention will appear in connection with the detailed description thereof and the novel features embodied in my inventive idea will be particularly pointed out in the claims.

In the accompanying drawings which illustrate the application of my invention in two of the embodiments which it may assume,—

Fig. 1 is a sectional elevational view showing my invention applied to a common type of hot air furnace. Fig. 2 is a fragmentary rear elevational view. Fig. 3 is a view in horizontal section on the line 3—3 of Fig. 1. Fig. 4 is a view in vertical section on the line 4—4 of Fig. 1. Fig. 5 is a sectional elevational view of a somewhat different form of construction.

Referring to the form of invention shown in Figs. 1 to 4, the numeral 10 designates a hot air furnace having a hot air chamber 12 from the top of which a hot air pipe leads. This hot air pipe consists of a horizontal section 14 connecting with a vertical section 16 which extends up to a hot air register 18. As shown, the bottom of the section 16 is not closed but is provided with a bottom in the form of a truncated cone which provides an opening 20. Around the pipe section 16 and spaced therefrom is a pipe 22 which leads from a cold air register 24 which is placed around the hot air register 18. The lower end of the pipe 22 at about the level of the opening 20 is preferably reduced to form a conical portion 24 which connects the pipe 22 with a casing 26 which constitutes a filtering chamber. The lower portion of this filtering chamber is connected by a pipe 28 with the lower portion of the hot air chamber 12. The lower side of the pipe 28 is preferably made in the form of a trough 30 inclined downwardly toward the bottom of the filtering chamber in order to carry water which sprays into the pipe 28 back into the filtering chamber. A water supply pipe 32, preferably controlled by a cock 34, leads into the upper portion of the filtering chamber and terminates centrally therein in a nozzle 36 provided with perforations for producing a conical spray of water. A discharge pipe 38 provided with a trap 40 leads from the filtering chamber, the inner end of this pipe terminating slightly above the bottom of the casing 26. The pipe 38 may be connected with a sewer in order to carry away the water which overflows from the filtering chamber. The casing 26 near its bottom is provided with a clean-out door or slide 42, and the upper portion of the casing is provided with a door or slide 44 in order that access may be had to the nozzle 46.

In the form of invention shown in Fig. 5, a hot air furnace 46 has a hot air chamber 48 provided at its upper end with an extension 50 which leads into a vertical hot air pipe 52, terminating in a hot air register 54. The lower portion of the pipe 52 terminates in a conical bottom 56 which is connected by a pipe 58 with a casing 60 which constitutes a filtering chamber. The casing 60 is connected by a pipe 62 with a cold air register 64, and, as shown, another cold air pipe 66 may lead into the pipe 62 from any suitable place. A water supply pipe 68, preferably controlled by a cock 70, leads into the upper portion of the filtering chamber and terminates centrally therein in a nozzle 72 provided with perforations for producing a conical spray of water. The lower portion of the filtering chamber is connected by a pipe 74 with the lower portion of the hot air chamber 48. The lower side of the pipe 74 preferably connects with the casing 60 by means of a trough-like portion 76 which carries back the water sprayed into the pipe 74 into the filtering chamber. In this form of the invention there is shown a tube 78 which extends through the casing 60 a short distance above the bottom thereof. A hose may be attached to this tube for carrying away the overflow water in cases where it is not desirable or practical to make connection directly with a sewer. The casing 60 near its bottom is provided with a clean-out door or slide 80 and the upper portion of the casing is provided with a door or slide 82 by means of which access may be had to the nozzle 72.

The operation and advantages of my invention will be obvious from the foregoing description. A current of cold air passes through the filtering chamber and then into the hot air chamber. While passing through the filtering chamber the cold air is subjected to the action of a spray of water which effectively washes out dust and impurities. Considerable moisture is carried by the current of cold air into the hot air chamber, so that the air which is delivered to the rooms to be heated is humidified as well as cleaned. An important feature of my invention consists in providing a construction whereby any dirt and mud which falls through the hot air register goes into the filtering chamber, where it either settles or is washed away by the water. In this manner such dirt and mud is prevented from getting into the hot air chamber and forming dust or particles to be carried back into the rooms by the hot air current. The provision of a discharge pipe near the lower end of the filtering chamber prevents the accumulation of too great a quantity of water therein and carries away the dirt which does not settle to the bottom of this chamber. The dirt which accumulates at the bottom may be removed from time to time as becomes desirable through the clean-out door.

I claim:

1. In combination with a hot air furnace having a hot air chamber, a casing which constitutes a filtering chamber, a passageway connecting the lower portion of said casing with the lower portion of the hot air chamber, a pipe connected with the top of said filtering chamber for conveying a current of cold air thereto, a water pipe leading into said filtering chamber, means on the inner end of said water pipe for producing a spray of water in said filtering chamber, and an upwardly-extending hot air pipe for conveying hot air to a hot air register, the bottom of said upwardly-extending pipe having an opening below the place of admission of hot air thereinto for passage into said filtering chamber of dirt falling through the hot air register.

2. In combination with a hot air furnace having a hot air chamber, a casing which constitutes a filtering chamber, a passageway connecting the lower portion of said casing with the lower portion of the hot air chamber, a pipe connected with the top of said filtering chamber for conveying a current of cold air thereto, a water pipe leading into said filtering chamber, means on the inner end of said water pipe for producing a spray of water in said filtering chamber, a pipe for conveying water from the bottom of said filtering chamber, and an upwardly-extending hot air pipe for conveying hot air to a hot air register, the bottom of said upwardly-extending pipe having an opening below the place of admission of hot air thereinto for passage into said filtering chamber of dirt falling through the hot air register.

3. In combination with a hot air furnace having a hot air chamber, a casing which constitutes a filtering chamber, a passageway connecting the lower portion of said casing with the lower portion of the hot air chamber, a pipe connecting a cold air register with the top of said filtering chamber for conveying a current of cold air thereto, a water pipe leading into said filtering chamber, and means on the inner end of said water pipe for producing a spray of water in said filtering chamber.

4. In combination with a hot air furnace having a hot air chamber, a casing which constitutes a filtering chamber, a passageway connecting the lower portion of said casing with the lower portion of the hot air chamber, a pipe connecting a cold air register with the top of said filtering chamber for conveying a current of cold air thereto, a water pipe leading into said filtering chamber, means on the inner end of said water pipe for producing a spray of water in said filtering chamber, and an upwardly-extending hot air pipe for conveying hot air to a hot air register, the bottom of said upwardly-extending pipe having an opening below the place of admission of hot air thereinto for passage into said filtering chamber of dirt falling through the hot air register.

5. In combination with a hot air furnace having a hot air chamber, a casing which constitutes a filtering chamber located directly below a cold air register, a pipe connecting the cold air register with the top of said filtering chamber for conveying a current of cold air thereto, a pipe connecting the lower portion of said casing with the lower portion of the hot air chamber, a water pipe leading into said filtering chamber, means on the inner end of said water pipe for producing a spray of water in said filtering chamber, and an upwardly-extending pipe for conveying hot air to a hot air register, the bottom of said upwardly-extending pipe having an opening below the place of admission of hot air thereinto for passage into said filtering chamber of dirt falling through the hot air register.

6. In combination with a hot air furnace having a hot air chamber, an upwardly extending hot air pipe for conveying hot air to a hot air register, said pipe being displaced laterally away from over said hot air chamber, and a laterally extending member connecting the top of said hot air chamber with said upwardly extending pipe, the bottom of said pipe having an opening below the place of admission of hot air thereinto for passage of dirt falling through the hot air register whereby such dirt is prevented from getting into the hot air chamber.

In testimony whereof I hereunto affix my signature.

DANIEL HANDELAN.